Dec. 12, 1961

HENRI-GEORGES DOLL
ELECTROSTATIC SHIELDS 3,013,102

Filed May 24, 1945

INVENTOR.
HENRI-GEORGES DOLL
BY
Hoguet, Neary & Campbell
ATTORNEYS

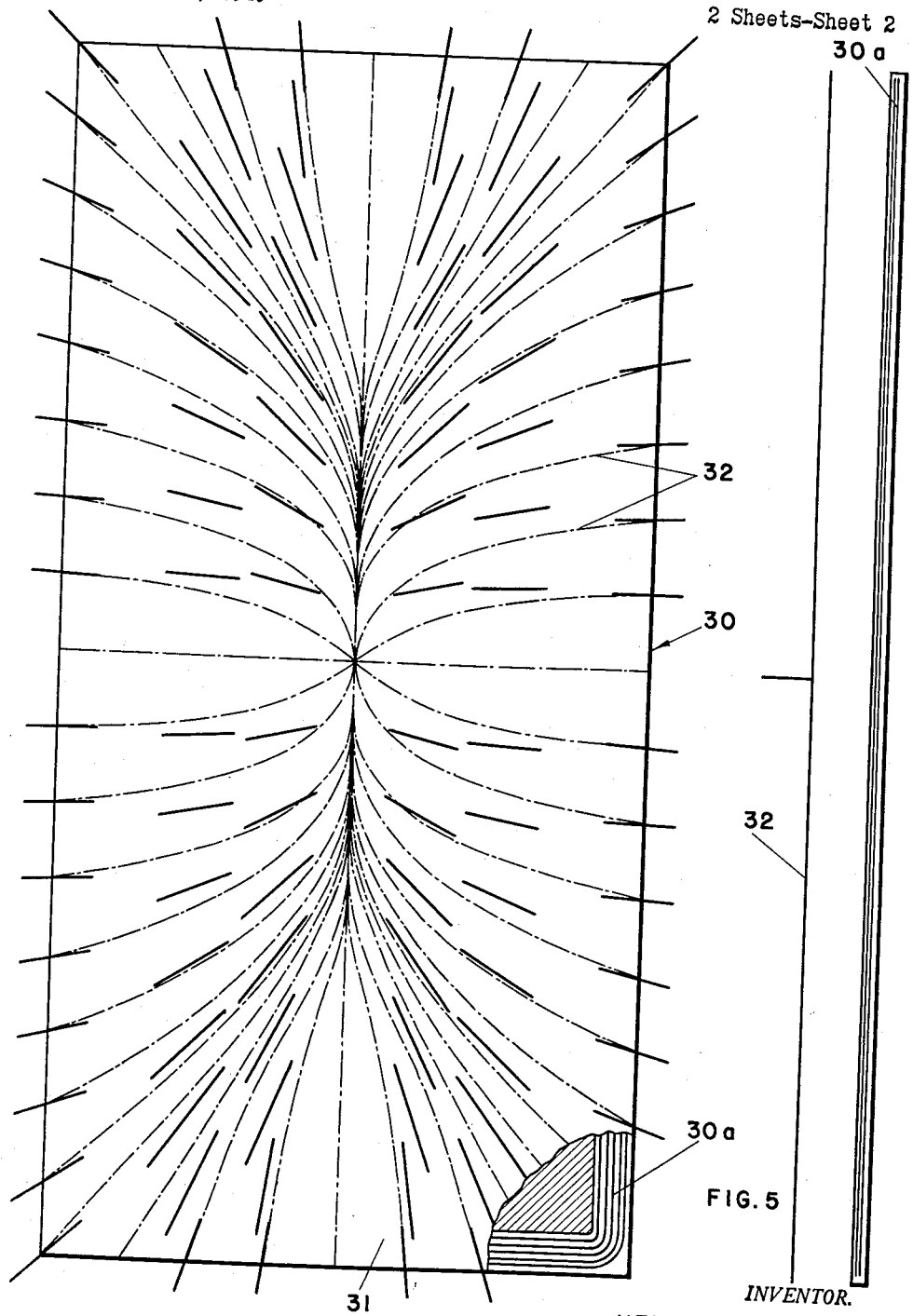

3,013,102
ELECTROSTATIC SHIELDS
Henri-Georges Doll, Houston, Tex., assignor to Electro-Mechanical Research, Inc., Houston, Tex., a corporation of Texas
Filed May 24, 1945, Ser. No. 595,572
4 Claims. (Cl. 174—35)

This invention relates to improvements in electrostatic shields for electrical circuits or elements of such circuits, and it relates particularly to electrostatic shields for coils.

Electrostatic shields are commonly used in connection with electrical circuits of all types and are especially useful in connection with alternating current circuits which operate at moderate or high frequencies. Their function is to prevent the transfer of energy from one circuit to another through the capacitance that exists between the two circuits.

Many of the shields proposed heretofore, such as, for example, the shell type, are quite satisfactory for use with equipment that is totally enclosed and permanently mounted. However, such shields are not entirely satisfactory when they are used in circuits having high frequency potentials and between circuits which are intended to have no mutual impedance.

In order for the shielding effect to be perfect, it is necessary that every element of the shield and every point on every element of the shield be at ground potential. In shielding two coils from each other, if an electrostatic shield is placed between the coils, it will not be perfectly efficient if any element of the shield has a potential other than zero. This cannot always be accomplished by grounding one end of the shield or, for that matter, by grounding a plurality of points on the shield. If an electromotive force is induced in the connection between the shield and ground, the shielding will not be perfect. Likewise, should a potential appear at any point of the shield, then energy will be transmitted from that point to the secondary winding, if there is any mutual coupling between them.

A typical example of a device requiring highly efficient shielding is the mutual inductance type of detector that is used for locating subterranean bodies such as, for example, land mines.

Usually these detecting devices include an oscillator which is connected to a transmitter coil that is disposed parallel to the earth. The receiver circuit includes a receiving coil preferably arranged at a right angle to the plane of the transmitter coil, an amplifier and an indicator such as a voltmeter. A handle may be attached to the coil assembly so that it can be swept near the surface of the earth. The device is so arranged ordinarily that no signal is produced in the receiving coil when the coil assembly is over a homogeneous material. However, when the homogeneity of the material is disturbed, as for example, by the presence of a buried mine, the dissymmetries of the eddy currents flowing in the earth induces a signal in the receiving coil. Such a detector must be very sensitive and well balanced in order to be effective.

The detecting coils of the detector are used under conditions in which the capacitance to ground varies abruptly over wide ranges. It is important in these devices that the changes in the capacitance to ground should not unbalance the bridge as otherwise a false signal will be produced each time the capacitance changes.

In order to prevent energy from flowing from the transmitter to the receiver through the capacitance between them, a shield is usually interposed between the coils and is suitably connected to ground. If the usual shield construction is included, it normally is not symmetrical with respect to both of the coils, and some coupling occurs between the shield and the transmitter coil, with the result that a potential appears on the shield. The connection to ground usually also is unsymmetrical with respect to the transmitter so that an additional potential is induced in it. As a result, the potential of the shield is not zero, even though it is electrically connected to ground.

If the potential of the shield changes, a corresponding change may be produced in the receiver coil. Usually such changes do not occur because of variation in the potential of the transmitter coil, but wide variations may occur because of the change in the capacity between the shield and the earth. When, for example, the coil assembly is swept over the ground at an elevation of only a few inches, the shield may strike weeds or tall grass. Inasmuch as grass and weeds are, in effect, a large capacitance and a low impedance and the shield is not at ground potential, current flows from the potential source on the shield through the weed to ground and back through the ground connection to the potential source. This flow of current may be relatively large, with the result that strong potential is created in the receiving coil, and a large signal is produced in the meter. Such false signals are the direct result of the lack of efficiency of the electrostatic shield and would not be produced if there were not a mutual inductance between the transmitter and the shield, and between the shield and the receiver.

An object of the present invention is to provide an electrostatic shield, each element of which has no mutual inductance with one or all of the circuits to be shielded from each other.

A further object of the invention is to provide a shield which has no mutual inductance with a primary coil.

A further object of the invention is to provide a shield which has no mutual inductance with a secondary winding or coil.

Other objects of the invention will become apparent from the following description of typical forms of electrostatic shields embodying the present invention.

In accordance with the present invention, electrostatic shields are provided in which every element and every point on every element of the shield is so arranged that coupling cannot take place between the shield and the coil with which it is associated. More particularly, the elements of the shield, preferably wires of high conductivity, are arranged at such an angle and with such symmetry with respect to the coil elements that coupling cannot take place between the elements of the shield and the coil. In this way, no potential can occur in any of the elements of the shield or any point along the shield, with the result that variable capacity effects between the shield and ground cannot produce false signals.

For a better understanding of the present invention, reference may be had to the accompanying drawings in which:

FIGURE 4 is a schematic plan view of a rectangular coil showing the proper curvature of the shield elements required to provide a high efficiency electrostatic shield of the type embodying the present invention; and FIGURE 5 is a view in side elevation of the coil and shield disclosed in FIGURE 4.

Figure 1:
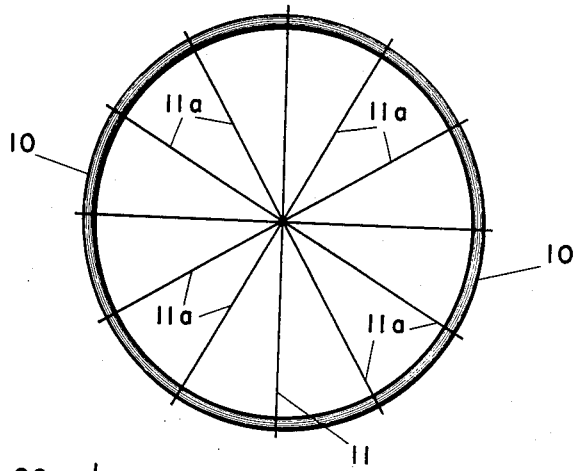
FIGURE 1 is a plan view of a circular coil having elements of an electrostatic shield embodying the invention shown thereon.
Figure 2:
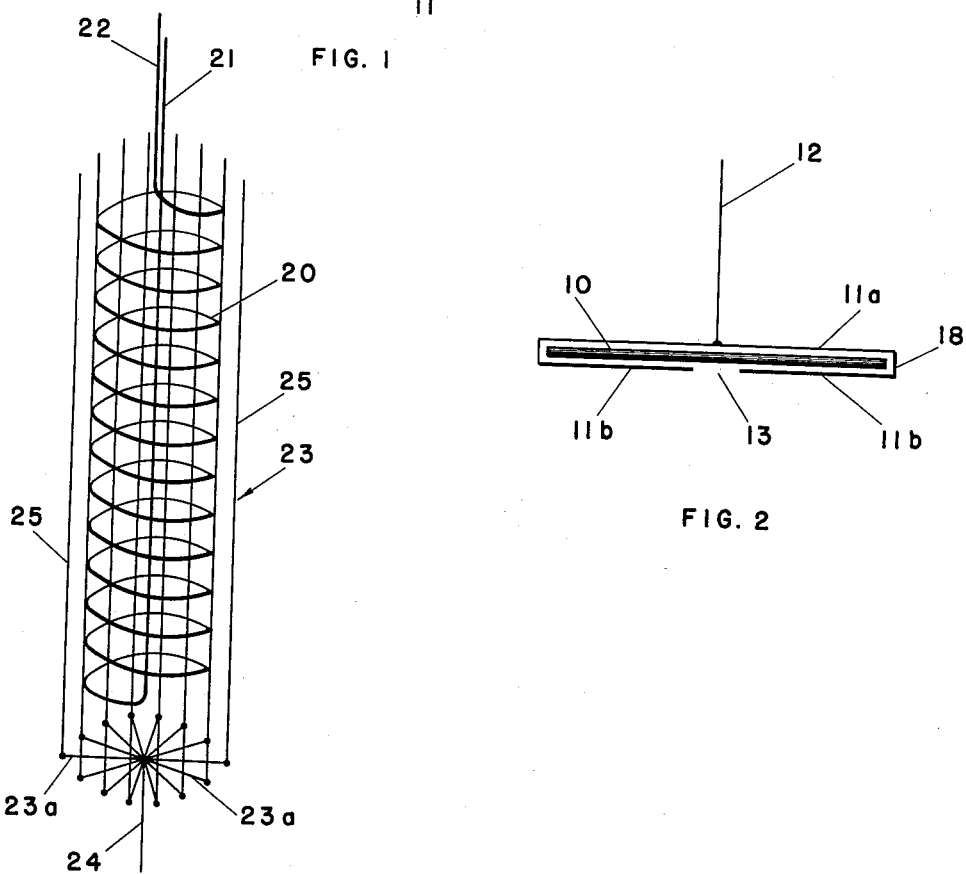
FIGURE 2 is a view in side elevation of the coil and shield of FIGURE 1.

FIGURES 1 and 2 disclose a typical form of shield and a circular coil, the shield having no mutual inductance with the coil. In this form of invention, a circular coil 10 is provided with a shield 11 which includes a series of radially extending conductors 11a which are connected at the center of the coil to ground by means of suitable lead or ground wire 12. If the shield is to enclose the coil completely, the radial conductors 11a are bent around the edge of the coil, and the ends 11b of the conductors converge radially toward the center of the coil.

In order to prevent coupling between the coil leads (not shown), and the shield 11, and the ground connection 12, the leads of the coil are preferably coaxial or twisted and leave the coil along its axis, passing through the opening 13 between the inner ends of the conductors 11b. Inasmuch as the shield is completely symmetrical with respect to the coil, there can be no inductance between the coil 10 and any of the shield wires 11a, 11b, and, therefore, no induced potential will appear in any part of the electrostatic shield.

Figure 3:
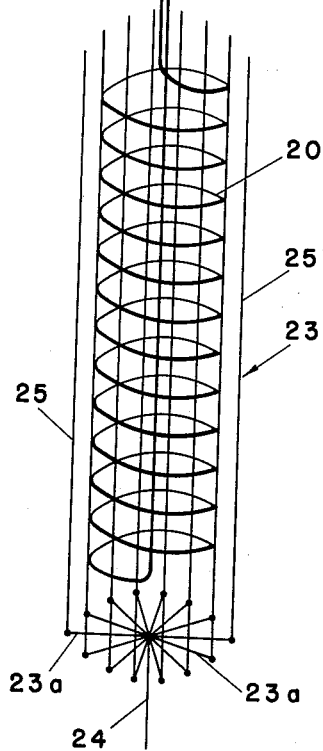
FIGURE 3 is a perspective view of a solenoid type coil equipped with an electrostatic shield of the type embodying the present invention.

FIGURE 3 discloses a similar type of shielding as applied to a solenoid type coil 20. In this type of shield, the leads 21 and 22 to the coil are arranged coaxially or twisted and extend along the axis of the coil 20.

The shield 23 includes a group of conductors 23a extending radially from the axis of the coil and are connected at their inner ends to ground by means of a conductor 24. At the outer ends of the conductors 23a are a plurality of wires 25 which extend parallel with, and equi-distant from, the axis of the coil. Here again, inasmuch as the shield is symmetrical with the coil throughout its entire extent, no potential will be induced at any part of the shield 23.

While the above described shields provide efficient shielding of symmetrically shaped coils, such as circular or cylindrical, a somewhat different situation arises when odd shaped coils are to be shielded. With such coils, it is not possible to attain complete shielding by extending the shield wires radially from the axis of the coil.

FIGURES 4 and 5 disclose a form of electrostatic shield, embodying the invention, applied to a rectangular coil 30 in which the coil winding 30a is supported upon a generally rectangular base member 31. In the form of the coil disclosed, its length is twice its width and the shield may be spaced above the coil a distance equal to one-eighth the coil width. As indicated before, if each elemental length of each wire in the shield has no mutual inductance with the coil, then the total shield will have no mutual inductance with the coil. Upon this basis, it is possible to obtain a mathematical equation which indicates the tangent or slope of the shield conductors at any point along the coil by considering a small rectilinear element of a shield characterized by its position and its angle with the sides of the coil. The mutual inductance between this element of the shield and the coil can be computed by conventional formulae. These equations will give the mutual inductance in terms of the position of the element and the angle. By equating this expression for the mutual inductance to zero, the angle that the shield wire should make at any point can be determined. If the shield wire is so shaped that it satisfies these equations at every point, then there will be no mutual inductance between any element of the shield and the coil.

Actually, the reduction of the mutual inductance equations leads to the following equation for the slope of the curve of the shield wire at any point T having rectangular coordinates $a$ and $b$; $x$ and $y$ being equal to one-half the length and one-half the width, respectively, of the coil, and $h$ being the spacing between the coil and the shield:

$$\tan\theta = \frac{\begin{aligned}&+\log[\sqrt{(x-a)^2+(y-b)^2+h^2}-(x-a)]\\&+\log[\sqrt{(x-a)^2+(y+b)^2+h^2}+(x-a)]\\&-\log[\sqrt{(x+a)^2+(y-b)^2+h^2}-(x+a)]\\&-\log[\sqrt{(x+a)^2+(y+b)^2+h^2}+(x+a)]\end{aligned}}{\begin{aligned}&+\log[\sqrt{(x-a)^2+(y+b)^2+h^2}+(y+b)]\\&+\log[\sqrt{(x+a)^2+(y+b)^2+h^2}-(y+b)]\\&-\log[\sqrt{(x+a)^2+(y-b)^2+h^2}-(y-b)]\\&-\log[\sqrt{(x-a)^2+(y-b)^2+h^2}+(y-b)]\end{aligned}}$$

The angles or slopes for a number of points on each of the wires are indicated as straight solid lines on FIGURE 4. From these lines, it is possible to interpolate curves to be followed by the shield wires 32 shown as dotted lines.

In order to provide a very efficient shield, the wires should be quite close together. Inasmuch as it may be inconvenient to form a shield like that disclosed in FIGURES 4 and 5 with the wires very close together, a very satisfactory alternative is to surround each coil or circuit element with conventional closely wound shields and then to insert a special shield of the type disclosed above between the two shielded coils. In this way, effective shielding can be accomplished with the wires which are more widely spaced.

From the preceding description, it will be apparent that a very effective and highly efficient electrostatic shield has been produced. It will be understood, of course, that the spacing of the elements of the shield may be varied considerably as the purpose demands and that such shields may be applied to other types of coils, circuits or elements of circuits than those disclosed above.

Therefore, the forms of the invention described above should be considered as illustrative and not as limiting the scope of the following claims.

I claim:

1. An electrostatic shield for an electrical element comprising a plurality of conductors disposed adjacent to said element and extending outwardly from and substantially perpendicularly to an axis passing through the center of said element, and means coaxial with said axis for connecting said conductors to ground, all parts of said shield and said connecting means being disposed at such an angle to said electrical element as to have no mutual inductance therewith.

2. An electrostatic shield for a coil having a winding disposed about an axis, comprising a plurality of conductors extending radially outwardly from said axis substantially perpendicular to said axis and having portions parallel to said axis adjacent to the outer periphery of said coil, and means coaxial with said coil for connecting all of said conductors to ground, all parts of said shield and said connecting means being disposed at such an angle to said coil as to have no mutual inductance therewith.

3. An electrostatic shield for a coil having a winding comprising a plurality of conductors adjacent to said coil and extending outwardly from the center thereof in a plane substantially perpendicular to the axis of said winding, each of said conductors being inclined at such an angle as to have no mutual inductance with said winding, and means coaxial with the center of said coil for connecting said conductors to ground, all parts of said shield and said connecting means being disposed at such an angle to said coil as to have no mutual inductance therewith.

4. An electrostatic shield for a substantially rectangular coil comprising a plurality of conductors extending outwardly from an axis passing through the center of the coil and perpendicular thereto, said conductors being inclined at each portion relatively to said coil at such an angle that each portion of each conductor of the shield has no mutual inductance with said coil, and means coaxial with said axis for connecting said conductors to ground, all parts of said shield and said connecting means being disposed at such an angle to said coil as to have no mutual inductance therewith.

References Cited in the file of this patent

UNITED STATES PATENTS

| | | |
|---|---|---|
| 767,974 | Stone | Aug. 16, 1904 |
| 2,064,831 | Hawksley | Dec. 22, 1936 |
| 2,189,309 | Carlson et al. | Feb. 6, 1940 |
| 2,227,846 | Rust | Jan. 7, 1941 |
| 2,249,129 | Grimditch | July 15, 1941 |
| 2,385,012 | Lytle | Sept. 18, 1945 |

FOREIGN PATENTS

| | | |
|---|---|---|
| 129,022 | Austria | July 11, 1932 |